United States Patent

Brunn et al.

[11] Patent Number: 4,589,906
[45] Date of Patent: May 20, 1986

[54] INORGANIC DEPOT FERTILIZERS

[75] Inventors: Horst Brunn, Krefeld; Johannes Niggemann, Leverkusen; Peter Köhler; Franz Hund, both of Krefeld, all of Fed. Rep. of Germany

[73] Assignee: Bayer Aktiengesellschaft, Leverkusen, Fed. Rep. of Germany

[21] Appl. No.: 479,772

[22] Filed: Mar. 28, 1983

[30] Foreign Application Priority Data

Apr. 3, 1982 [DE] Fed. Rep. of Germany ....... 3212537

[51] Int. Cl.$^4$ .............................................. A01N 59/00
[52] U.S. Cl. .......................................... 71/80; 71/37; 71/44; 71/58; 71/60; 71/62; 71/63; 423/593; 423/594; 423/600; 423/632
[58] Field of Search ................... 71/60, 63, 37, 39, 40, 71/41, 44, 58, 62, 80-84

[56] References Cited

U.S. PATENT DOCUMENTS 3,907,538 9/1975 Hauschild ................. 71/34
4,077,794 3/1978 Piccolo et al. .............. 71/31
4,350,675 9/1982 Drake ....................... 424/1

FOREIGN PATENT DOCUMENTS 8000668 1/1981 European Pat. Off. .
329054 4/1958 Fed. Rep. of Germany .
2353125 4/1974 Fed. Rep. of Germany .
2648119 4/1978 Fed. Rep. of Germany .
2903263 8/1980 Fed. Rep. of Germany .
0041169 12/1981 Fed. Rep. of Germany .
2273471 1/1976 France .
2506296 11/1982 France .
1184332 3/1970 United Kingdom .

*Primary Examiner*—T. Tung
*Attorney, Agent, or Firm*—Sprung Horn Kramer & Woods

[57] ABSTRACT

A depot fertilizer composition comprising an inorganic matrix and another inorganic and/or organic component of the formula

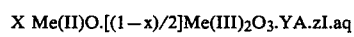

$$X\,Me(II)O.[(1-x)/2]Me(III)_2O_3.YA.zI.aq$$

in which
Me (II) is at least one divalent metal,
Me(III) is at least one trivalent metal,
A is at least one inorganic acid or anhydride of an inorganic acid,
I is at least one organic compound,
aq is 0–9,
X is from 0 to 1,
Y is from 0.5 to 0.7, and
Z is from 0 to 20, at least one of the components containing a plant nutrient element. The compositions are suited for fertilizing the leaves or full systems of plants growing in soil or in water.

8 Claims, No Drawings

INORGANIC DEPOT FERTILIZERS

This invention relates to novel depot fertilizers comprising inorganic, adsorbable and desorbable multicomponent systems hereinafter referred to as composition compounds.

It is known that silicate-containing, clay minerals in natural soils contain plant nutrient ions, primarily cations, both in the matrix and also in sorbed form. Synthetically produced and natural clay minerals may be used as fertilizers providing they contain plant nutrients in a form which permits them to be adequately taken up by plants or, after incorporation in a culture medium (for example earth, horticultural soils and culture substrates), make the properties of that culture medium more favorable to plant growth. Such substances fed directly or indirectly to useful plants are capable of promoting growth, increasing yield and improving the quality of the plant products. Bentonite (cf. F. Köhlein: Gartenpraxis 10/1978, pages 515–516; R. Fahn: Was Ist Bentonit? (What is Bentonite?) Sonderdruck Süd-Chemie AG 1968) is frequently used for ameliorating light sandy soils (J. Lhotsky, Intern. Zeitschr. Landwirtsch. Moscow/Berlin, No. 2, pages 180–183, 1976) and for improving culture media (E. Schwemmer: Gartenwelt 76, 426–428, 1976). Modified montmorillonites are acquiring increasing significance, particularly in Israel, as substrates for macronutrients and particularly for micronutrients for plants (A. Banin and J. Navrot. Agron. J. 68, 353–358, 1976; J. Navrot; A. Banin, Agron. J. 68, 358–361, Plant and Soil 42; 309–312, 1975).

Heat-expanded, naturally occurring clays for example vermiculite, are also important as soil and substrate improving agents. In many cases, these expanded materials may also be used as inert substrates in plant cultivation.

A nitrogen depot fertilizer can be produced from vermiculite by treatment with ammonia (J. Russel, A. Fraser, J. Sci. Fd. Agric. 28, 852–854, 1977).

Synthetic zeolites (sodium aluminum silicates) will also acquire a certain significance in the future as fertilizers and soil improving agents (A. Dyer, Ann. Meeting Sect. B., No. 41, Brit. Assoc. Adv. Sci. BA AT Salford, 1980). Synthetic zeolites of this type and also naturally occurring zeolites, such as clinoptilolite, may also be used as fertilizers after enrichment with plant nutrients (D. Hershey, J. Paul, R. Carlson, Hort. Sci. 15, 87–89, 1980).

All the previously mentioned depot fertilizers mainly have the properties of cation exchangers. It would be desirable to use depot fertilizers which are also capable of binding anions, particularly in the case of soils and culture substrates which have only a limited retention capacity for nutrient anions.

Composition systems in which sorption complexes are capable of taking up and releasing ions and organic compounds have already been described (British Patent No. 1,184,332).

The use of citrate-stabilized iron(III)-oxide hydroxide hydrate sols and gels in human and veterinary medicine has also been described (DE-OS No. 29 03 263).

U.S. Pat. No. 4,249,930 describes a novel ionic compound which is produced by grinding iron sulfate and urea together in a ball mill. The aquocarbamide iron(II)-sulfate compound obtained is suitable for use as an agent for controlling iron-deficiency chlorosis in plants.

The object of the present invention is to provide novel depot ferilizers which show particularly favorable properties both as anion exchangers and also as cation exchangers.

Materials which eminently satisfy these requirements are depot fertilizers consisting of an inorganic matrix and another inorganic and/or organic component corresponding to the following general formula:

in which
Me(II) represents one or more divalent metals;
Me(III) represents one or more trivalent metals;
A represents one or more inorganic acids or anhydrides of inorganic acids,
I represents one or more organic compounds; and
aq represents 0–9 $H_2O$ and preferably 0.5–6 $H_2O$;
x, y and z are whole numbers or fractions, with respective values of x from 0 to 1 and preferably from 0.2 to 0.9; of y from 0.05 to 0.7 and of z from 0 to 20, with the further proviso that at least one of the components contains a plant nutrient element.

They show excellent fertilizer properties, including in particular a long-lasting flow of nutrients.

In the formula:

the divalent metals may be one or more of the group comprising calcium, magnesium, iron, manganese, copper, nickel, cobalt and zinc, while the trivalent metals may be one or more of the group comprising aluminum, iron and manganese.

The other inorganic constituents (A) are inorganic acids and/or anhydrides of inorganic acids of the elements nitrogen, phosphorus, sulfur, chlorine, boron, carbon, silicon, molybdenum, titanium and/or vanadium.

The elements nitrogen, phosphorus, sulfur, potassium, calcium and mangnesium perform the function of primary nutrient elements, while iron, manganese, zinc, copper, chlorine, boron and molybdenum act as trace nutrient elements; potential nutrient elements are sodium, cobalt, silicon, aluminum, vanadium, nickel and titanium (cf. Finck, Pflanzenernahrung in Stichworten, Verlag F. Hirt, 1969; Finck, Dünger und Dügung, Verlag Chemie 1979).

The organic compounds (I) present may be complexing agents, for example citric acid, ethylene diamine, tetraacetic acid and other amino polycarbonxylic acids, (for example diethylene triamine pentaacetic acid), lignin sulfonates and their salts, alginates and their salts and other sea plant preparations, hydroxy acids and sugar which form P-sugar esters, for example with boron complexes and with phosphate, protein hydrolyzates, humus substances which have been extracted from natural starting materials or which may be synthetically produced. Modifications, fractions and preliminary steps of the above-mentioned compounds may also be present either individually or in admixture in the layer lattice compounds.

Other organic compounds already used as fertilizers, for example urea and glycerophosphates, may also be present in the compositions according to the invention.

The expression of the organic constituents as molar percentages is intended to show that they are for the most part integrated in the composition, i.e. for example have a greatly reduced, if any, solubility in water, etc. In some cases, however, it is more advantageous to express the organic component in percent by weight, based on the inorganic matrix. This applies particularly in the case of small organic components and/or in the case of high molecular weight or inadequeately defined (for example humic acid) organic substances.

It is also pointed out that the compositions according to the invention contain a percentage of water of crystallization of which the exact analytical determination involves dificulties because, in addition to the hydroxyl groups, very loosely bound water molecules are also present. Thus, dehydration phenomena can occur at temperatures as low as 60° C. This relatively "volatile" water component depends to a large extent upon the formulation conditions (drying temperature and time) and upon the crystallinity and particle size of the final depot fertilizer.

Thermogravimetric analysis of the compounds shows that dehydration of the substances takes place over the relatively wide temperature range of from 60° to 240° C. whereas dehydroxylation takes place at temperatures above 160° C. for substances rich in $Me^{2+}$ (in which case there may be fluid transitions between dehydration and dehydroxylation) and at temperatures above 280° C. for substances in which x has values of from 0.2 to 0.6. If a change is made to the composition dehydroxylation stage occurs at temperatures above 400° C.

The present invention also provides processes for producing the depot fertilizers corresponding to the following general formula:

$$x\,Me(II)O.[(1-x)/2]Me(III)_2O_3.y\,A.z\,I.a\,q$$

A first process is characterized in that a divalent and/or trivalent metal salt solution in the required ratio is precipitated normally, inversely or simultaneously at a temperature of up to 100° C. with an equivalent quantity or with an excess of alkali, optionally with alkali metallates, wherein the inorganic anions and the organic components are added together during or after precipitation or, optionally, after separation of the mother liquor of the host lattice.

Another process is characterized in that basic salts of the divalent and/or trivalent metals are treated with the acid form of the inorganic and, optionally, organic ions in air at a temperature of up to 100° C. and, optionally after alkalization are heated in an autoclave for up to 12 hours at a temperature of up to 350° C.

Combinations of the two above-described processes may of course also be applied, in which case salts of the inorganic and organic ions may also be used.

The preparations thus produced may be directly used in the form of suspensions. For working up into powder form, it is advisable to spray dry the depot fertilizers. Conventional drying units (such as drying carbinets) generally lead to hard, glass-like products which naturally require more grinding energy. This is attributable to the partly amorphous character of the preparations. Thus, it has generally proved to be advantageous to add organic auxiliaries before drying. The claimed complexing agents also act in this direction, so that there is generally no need for other thickening, drying and grinding aids.

Beating and disintegrating units (such as Bauermeister mills, steam jet mills) are preferably used for grinding. If subjected to pressure grinding (Raymond mills, etc), the preparations tend to stick and cake together, particularly when they have relatively high water contents.

General basic recipes for the formulation of plant protection agents and fertilizers may be used for the final formulation of the preparations, depending upon the particular application envisaged (dry or liquid fertilization). In the case of subsequent liquid fertilization, additions of lignin sulfonates lead to excellent, stable spraying suspensions.

The divalent metals employed as starting materials in the production of the depot fertilizers according to the invention may be used in the form of their hydroxides, hydroxy salts, carbonates, basic carbonates, sulfates, nitrates, chlorides, formates, acetates, oxalates and other organic compounds and also in the form of their active oxides. In addition, zinc may be used in the form of an alkali-metal zincate.

The trivalent metals may be used in the form of oxide hydroxides, hydroxides, hydroxy salts, carbonates, basic carbonates, nitrates, chlorides, sulfates, formates, acetates, oxalates and organic carboxylates. Aluminum may also be used in the form of an alkali metal aluminate. The remaining inorganic and organic constituents of the depot fertilizers are used either in the form of their salts or directly as the acids. Exceptions are such substances as urea which are used in the form of neutral molecules.

Suitable precipitants are substances which show an alkaline reaction, preferably sodium hydroxides, soda, ammonia, ammonium carbonate or mixtures thereof.

The compositions according to the invention may be used both as direct-acting plant fertilizers and also as indirectly acting soil fertilizers (soil and substrate improving agents). With the exception of leaf fertilization, they generally develop both effects simultaneously, especially since the nutrients are generally released slowly and in a continuous flow.

The compositions according to the invention are particularly suitable for use as special-purpose depot fertilizers for horticultural culture substrates and soils. In this case, the nutrients are primarily released through the root secretion of $H^+$ and $HCO_3^-$ and through organic root exudates. Compared with conventional depot fertilizers, such as those based on urea condensates, the release of nutrients from the new fertilizer is largely unaffected by microbial activity in the culture medium. Accordingly, there is no excessive, growth-damaging release of nitrogen in the substrate at high temperatures.

The anion adsorption capacity of culture substrates and horticultural soils is only very slightly pronounced by comparison with the cation sorption capacity. Of the primary plant nutrients always or mostly taken up in anionic form, namely nitrogen, phosphorus and sulfur, nitrate occurs almost exclusively in dissolved or readily soluble form, particularly in the aqueous phase of culture media.

Accordingly, in the event of heavy precipitation or watering, the nitrate is washed out relatively quickly, particularly from ornamental plant substrates (J. Soukup, Ztschr. Pflanzenern, und Bodenk. 120, 167, 1968). The considerable nitrogen loss thus incurred often has a growth-inhibiting effect.

By using nitrate-impregnated ion exchanger resins, of which the practical value is limited for reasons of cost, it was possible to make the following positive observations in horticultural substrates (cf. E. Poulsen, Physiol.

Plant. 12, 826, 1959); these positive observations also apply to NO$_3$-containing compositions:

(a) There is an absence of the fluctuations in the nitrate nitrogen content of the culture medium between the two extremes as occurs in the event of normal fertilization: plant-damaging excess of nitrate ions in the substrate solution and yield-reducing nitrogen deficiency through previous washing out of the nitrogen are also avoided.

(b) It is possible by these nitrate fertilizers to introduce additional nitrogen without significantly increasing the ion concentration of the substrate solution. In this way, safety of cultivation is considerably increased both in the case of young plants and also in the case of plants sensitive to salts.

(c) Plants fertilized with nitrate-containing compositions can be watered more frequently and more vigorously without any danger of serious nitrogen losses through the washing out of nitric nitrogen or denitrification, as is the case with conventional nitrogen fertilization (prohibition of the eutrophication of water).

(d) The uptake of nitrates by the roots of plants is generally more continuous and more commensurate with demand because the release of nitrates from the fertilizer is closely related to the particular level of root respiration activity. In contrast, preliminary microbial reactions dependent to a large extent upon the temperature and moisture content of the culture medium have to be carried out for the release of nitrogen from standard commercial urea condensates.

As a result, difficulties repeatedly arise in consequence of overfeeding or underfeeding of the plants with nitrogen. In this way, the control of cultivation in commercial undertakings is frequently made impossible.

Nitrate-containing compositions according to the invention come very close to the ideal of a nitrogen fertilizer because, by exchanging the hydrogen carbonate ions secreted by roots, plants are themselves able to supply the nitrogen which they require commensurate with demand. From the point of view of his law of action of growth factors, E. A. Mitscherlich (E. A. Mitscherlich: Bodenkunde, P. Parey, Berlin/Hamburg 1954; E. Deichmann:ABC der Pflanzenernährung und Düngung, Jaegersche Buchdruckerei Speyer 1949) has for some time been demanding a "new type of fertilizer which continuously gives off saltpetre to the roots of plants throughout their entire growth cycle" because in this way the yields of plants could be quite considerably increased without the nitrogen fertilizer having to be applied in portions at regular intervals, this being both labor-intensive and time-consuming.

By virtue of the above-described advantages of the compositions according to this invention charged with plant nutrients, the composition compounds according to the invention are also eminently suitable for use as long-term fertilizers in solution cultures (hydrocultures) and inert substrates (gravel, Leca clay and quartz sand), where conventional nitrogen depot fertilizers fail as nitrogen fertilizers as a result of inadequate microbial reactions. In this case, the nutrients are available from the claimed depot fertilizers not only by the root secretion of H$^+$ and HCO$_3^-$, but also by exchange for ions present in the water used. The nutrient-impregnated ion exchanger resins hitherto used as depot fertilizers (hydrofertilizers in short) for hydrocultures are relatively expensive products. The labor-saving and time-saving hydroculture process would be made more attractive by the use of less expensive, new compositions according to the invention as depot fertilizers. This applies both to hydrocultures in commercial horticulture and also to the hydroculture of ornamental plants in the home. The hydroculture of vegetables and spice plants is given fresh impetus as a leisure-time pursuit hobby by the depot fertilizers according to the invention and also by the fact that the constituents of the composition are almost exclusively plant nutrient, so that here is no danger of any toxicologically harmful residues from the fertilizer remaining in the edible parts of the plants.

Inexpensive hydroculture depot fertilizers will contribute to the adoption of hydroculture for flowerbox cultivation on a much wider scale than has hitherto been the case, especially since, with the assistance of an electromagnetic valve in the water supply and a water level governor, even relatively long holidays can be taken without the need for the plants to be attended in the meantime.

The depot fertilizers according to the invention are also eminently suitable for use as leaf-suspension fertilizers having a significantly longer-lasting effect than conventional liquid leaf fertilizers. The compatibility of the compositions with plants is considerably better than that of normal leaf fertilizers by virtue of lower salt concentrations on the leaf.

A combination of the depot fertilizers according to the invention with dissolving and complexing substances frequently leads to improvements in effect in leaf fertilizer systems. Suitable combination components are, for example, citric acid, malic acid, aspartic acid, phthalic acid, aminopolycarboxylic acids (for example diethylene, triaminopentaacetic acid) and lignin sulfonates. In the case of iron-containing depot fertilizers, citric acid is particularly suitable for use as an additive by virtue of its complexing and reducing properties, especially since, in many cases, iron is dissolved in or complexed with, primarily, citric (and malic) acid in plants.

Leaf fertilizers are marketed especially in the form of liquid leaf fertilizers and also in the form of water-soluble fertilizing salts. More recent depot leaf fertilizers are marketed primarily in the form of suspensions and pastes consisting of fertilizing salt particles which are prevented from cystallizing by special crystallization-inhibiting systems. Although the use of leaf fertilizers in powder form is known (P. Guest, H. Chapman, Proc. Amer. Soc. Hort. Sci. 54, 573–582, 1949), it has not yet acquired any practical significance.

The use of the new depot fertilizers containing plant nutrients either in their matrix or in incorporated form thus represents a new type of depot leaf fertilization in suspension form.

The depot fertilizers according to the invention have the same advantages as depot leaf fertilizers over existing liquid leaf fertilizers, including higher plant compatibility, high nutrient release levels and a longer-lasting effect.

The novel depot leaf fertilizers according to the invention afford the following advantages over existing commercial depot leaf fertilizer suspensions and pastes:

a. Formulation and packaging are simplified because, in contrast to fertilizing salt crystal suspensions and pastes, there is no need for a complicated, ingenious crystallization-inhibiting system.

b. Combination of the compositions with various plant nutrients to form multi-nutrient fertilizers and mixed trace nutrient fertilizers is easier.

c. There is greater protection against the photochemical decomposition of heavy metal complexes in strong sunlight, as known for example from the citrate-Fe(III)-complex (J. Frahn, Austral. Journ. Chemistry 11, 399–405, 1958).

d. Protection of the metal ions of the leaf fertilizer sprayed on against oxidation is increased, especially since the lower-valency form, such as $Fe^{++}$, is often more effective.

e. The powder form provides for easier storage, packaging, transport and dosage.

In order to improve the uptake and distribution of micronutrients, such as Fe, Mn, Cu, Zn, or secondary nutrients, such as Ca and Mg, additional dosages of complexing agents are added to the depot leaf fertilizers according to the invention. The already-mentioned complexing substances may be used for this purpose.

Surface-active compounds, primarily non-ionic, sluggishly reaction surfactants, are of considerable importance as formulation aids for guaranteeing effective distribution and uptake of the plant nutrients applied to the leaf, especially since their use avoids local over-concentrations on leaves which could lead to damage.

In order to obtain heavy metal trace nutrients in a better absorbable and storable low-valency form in the plant, substances having a reducing effect, for example lignin sulfonates, citric acid, organic acids containing oxidizable phenolic OH-groups or preliminary stages thereof, may be added to the depot leaf fertilizers according to the invention, being converted into the above-mentioned compounds in the plant by means of hydrolases.

In order to accelerate uptake, $MgCO_3$ may also be added to the depot leaf fertilizers according to the invention, which can increase its effectiveness, on heavily wax-coated leaves, beause the layer of wax is reduced.

Moisture-attracting and -retaining substances so-called stickers, such as glycerol, may also be added to depot leaf fertilizers according to the invention because the effect of leaf fertilization depends to a large extent on the spray-coating on the leaves remaining in solution for as long as possible in order in this way to guarantee better, longer-lasting uptake of the nutrients. Additions such as these are desirable particularly in areas where there is very little air humidity and dew formation.

Fertilizers in normal, readily soluble or sparingly soluble salt form may also be added in non-phytotoxic concentrations to the compositions used as depot leaf fertilizers in accordance with the invention. In this way, it is possible, for example, to increase the more readily soluble component of the leaf fertilizers.

Compositions according to the invention may also be used as constituents of known crystal suspension or crystal paste depot leaf fertilizers in which they reinforce the slow-acting component.

The various above-mentioned fertilizers consisting of the compositions may be formulated, marketed and used not only in slurry form (made up from powders and granulates), but also in purpose-oriented form, i.e. in the form of shapes such as wedges, discs and tapes and also in a bedding of a textile, a hydrophilic polymer or a gel.

The invention is further illustrated by the following examples.

EXAMPLE 1

A solution of 97.5 ml of $Na_{1.48}Al(OH)_{4.48}$-solution (400 g of $Al(OH)_3$/l) and 10.4 g of NaOH (made up to 300 ml with water) is added over a period of 15 minutes with stirring to 192.3 g of $Mg(NO_3)_2.6H_2O$ dissolved in 1500 ml of water. After brief stirring (15 minutes), the pH-value is adjusted or re-adjusted to 8.5 by the addition of either sodium hydroxide or nitric acid. The suspension is then stirred for another 3 hours, and then filtered, the filter cake being washed, spray-dried and ground.

System: $xMgO[(1-x)/2]Al_2O_3yN_2O_5aq$ x: 0.6
y: 0.2
aq: 2.0 (determined by preliminary tests in all the examples (1 to 16)).

| Analysis | % by weight |
| --- | --- |
| MgO | 23.7 (0.602) |
| $Al_2O_3$ | 20.3 (0.203) |
| $N_2O_5$ | 19.6 (0.186) |
| $H_2O$ | 36.2 (2.0) |

EXAMPLE 2

Semi-concentrated nitric acid (25.205 g of $HNO_3$) is added to 93.312 g of $Mg(OH)_2$ and 40.784 g of $Al(OH)_3$ suspended in 200 ml of water, followed by homogenization (duration: up to $pH \geq 6$). The entire reaction takes place in an autoclave (6 hours, 300° C., approx. 86 bars). Subsequent working up consists of drying (120° C.) and grinding.

System: $xMgO[(1-x)/2]Al_2O_3yN_2O_5aq$ x: 0.8 p1 y: 0.1
aq: 1.5

| Analysis | % by weight |
| --- | --- |
| MgO | 39.7 (0.79) |
| $Al_2O_3$ | 12.7 (0.1) |
| $N_2O_5$ | 13.2 (0.099) |
| $H_2O$ | 34.6 (1.5) |

EXAMPLE 3

Semi-concentrated nitric acid (12.6 g of $HNO_3$) is added to 49.4 g of $Ca(OH)_2$ and 25.97 g of $Al(OH)_3$ made into a paste with 100 ml of water, followed by homogenization. The reaction takes place in an autoclave (4 hours, 300° C., approx. 86 bars). Thereafter, the product only has to be dried (120° C.) and ground.

System: $xCaO[(1-x)/2]Al_2O_3yN_2O_5 aq$ x: 0.667
y: 0.1
aq: 1.5

| Analysis | % by weight |
| --- | --- |
| CaO | 39.6 (0.660) |
| $Al_2O_3$ | 18.0 (0.165) |
| $N_2O_5$ | 11.3 (0.098) |
| $H_2O$ | 31.1 (1.6) |

EXAMPLE 4

12.37 g of Ca(OH$_2$) are suspended in 100 ml of water and the resulting suspension is subsequently dissolved in a slight excess of nitric acid (22 g of HNO$_3$). Two solutions (solution A: 64.9 ml of Na$_{1.48}$Al(OH)$_{4.48}$ (400 g of Al(OH)$_3$/l), solution B: 37.05 g of Ca(OH)$_2$ suspended in 1000 ml of water) are then added to the resulting solution such that a Ca:Al ratio of 2:1 is maintained during the addition of the two solutions (addition time: approximately 30 minutes). The pH-value is then slowly reduced to 9.0 with 63% by weight nitric acid and the suspension is subsequently stirred for 3 hours. Working up comprises the usual steps (filtration, washing and drying (120° C.) and grinding):

System: xCaO[(1−x)/2]Al$_2$O$_3$yN$_2$O$_5$aq x: 0.667
y: 0.167
aq: 2.0

| Analysis | % by weight |
|---|---|
| CaO | 34.1 (0.640) |
| Al$_2$O$_3$ | 16.5 (0.170) |
| N$_2$O$_5$ | 15.6 (0.152) |
| H$_2$O | 35.5 (1.96) |

EXAMPLE 5

168.7 g of Ca(NO$_3$)$_3$.4H$_2$O, 67 g of Al(NO$_3$)$_3$.9H$_2$O and 72.14 g of Fe(NO$_3$)$_3$.9H$_2$O are dissolved in 500 ml of water and the resulting solution is precipitated over a period of 30 minutes by the addition of 45% by weight NaOH (final pH-value: 12.0). The suspension is then stirred for 6 hours, subsequently filtered and washed with water until free from nitrate. The liquefied filter cake is spray-dried and subsequently ground.

System: xCaO[(1−x)/2]Me$_2$O$_3$yN$_2$O$_5$aq
p1 x: 0.667
Me: 0.5Al$^{3+}$ + 0.5Fe$^{3+}$
y: 0.167
aq: 2.0

| Analysis | % by weight |
|---|---|
| CaO | 32.2 (0.645) |
| Al$_2$O$_3$ | 7.6 (0.084) |
| Fe$_2$O$_3$ | 12.0 (0.084) |
| N$_2$O$_5$ | 15.7 (0.163) |
| H$_2$O | 32.4 (2.0) |

EXAMPLE 6a 47.7 g of ZnCl$_2$, 59.7 g of CuCl$_2$.2H$_2$O, 208.8 g of FeCl$_2$.4H$_2$O, 207.8 g of MnCl$_2$.4H$_2$O and 21.64 g of H$_3$BO$_3$ are dissolved in 2000 ml of water. The solution is then heated with stirring to 70° C., followed by the addition of 250 ml of a molybdate solution (30.89 g of (NH$_4$)$_6$Mo$_7$O$_{24}$.4H$_2$O). 45% by weight sodium hydroxide solution is then immediately added for precipitation (final pH-value: approx. 9). Towards the end of precipitation air is introduced into the suspension until an Fe$^{2+}$/Fe$^{3+}$-ratio of approximately 2.0 is obtained. Thereafter a blanket of nitrogen is maintained. The suspension is kept at 70° C. for 6 hours and subsequently filtered, the filter cake being washed free from Cl$^-$, spray-dried and ground.

System:
x$_1$ZnOx$_2$CuOx$_3$FeOx$_4$MnO[(1−x)/2]Fe$_2$O$_3$y$_1$
B$_2$O$_3$y$_2$MoO$_3$aq x$_1$: 0.125 (x=x$_1$+x$_2$+x$_3$+x$_4$)
x$_2$: 0.125
x$_3$: 0.25
x$_4$: 0.375
y$_1$: 0.0625
y$_2$: 0.0625
aq: 1.0

| Analysis | % by weight |
|---|---|
| Zn | 7.6 (0.123) |
| Cu | 7.6 (0.126) |
| Fe | 20.2 (0.38) (Fe$^{2+}$/Fe$^{3+}$: 2.09) |
| Mn | 19.4 (0.37) |
| B | 1.2 (0.117) |
| Mo | 5.2 (0.06) |
| H$_2$O | 16.8 (0.798) |

EXAMPLE 6b

The filter cake obtained in Example 6a is suspended in water in an atmosphere of nitrogen and 2.0% by weight of Komplexon-III (disodium salt of EDTA), based on the micronutrient fertilizer, is added to the resulting suspension which is then briefly stirred. Further working up is carried out in the same way as described in Example 6a.

Analysis of the filtrate and washing water shows that the complexing agent is absorbed substantially quantitatively (approximately 98%).

EXAMPLE 7a 47.4 g of ZnCl$_2$, 59.7 g of CuCl$_2$.2H$_2$O, 139.1 g of FeCl$_2$.4H$_2$O, 94.6 g of FeCl$_3$.6H$_2$O, 207.8 g of MnCl$_2$.4H$_2$O and 21.64 g of H$_3$BO$_3$ are dissolved in 2000 ml of water. The solution is stirred in an inert gas atmosphere (nitrogen) and heated to 70° C. 300 ml of a molybdate solution (30.89 g of (NH$_4$)$_6$Mo$_7$O$_{24}$.4H$_2$O) and 300 ml of a 45% by weight NaOH solution are then simultaneously added over a period of 15 minutes. The pH-value is increased to 9 by the addition of more NaOH solution and the suspension is stirred for another 2 hours at 70° C. After the filtration and washing step, the preparation is spray-dried and ground.

System: =Example 6a

| Analysis | % by weight |
|---|---|
| Zn | 7.7 (0.124) |
| Cu | 7.6 (0.125) |
| Fe | 20.2 (0.38) (Fe$^{2+}$/Fe$^{3+}$: 1.98) |
| Mn | 19.8 (0.38) |
| B | 1.2 (0.12) |
| Mo | 5.5 (0.06) |
| H$_2$O | 16.2 (0.95) |

EXAMPLE 7b

The filter cake obtained in Example 7a is suspended in water in a nitrogen atmosphere and 4% by weight of Na-lignin sulfonate, based on the micronutrient fertilizer, are added to the resulting suspension which is then stirred for about 30 minutes. The suspension is filtered, briefly washed and the liquefied filter cake is spray-dried and ground.

The C-content of the mother liquor and the washing water shows that approximately 85% of the lignin sulfonate has been absorbed onto the solid.

EXAMPLE 8a 47.7 g of $ZnCl_2$, 59.7 g of $CuCl_2.2H_2O$, 139.1 g of $FeCl_2.4H_2O$, 94.6 g of $FeCl_3.6H_2O$, 207.8 g of $MnCl_2.4H_2O$ and 43.3 g of $H_3BO_3$ are dissolved in 2000 ml of water. The solution is heated to 85° C. in a nitrogen atmosphere, followed by the addition of 600 ml of a molybdate solution (containing 61.78 g of $(NH_4)_6Mo_7O_{24}.4H_2O$). While the Mo-containing solution is flowing in, precipitation is carried out by the addition of 45% by weight sodium hydroxide (final pH-value: 8.5–9.0). After the filtration and washing steps (to remove $Cl^-$), the preparation is spray-dried and ground.

system:
$x_1ZnO x_2CuO x_3FeO x_4MnO[(1-x)/2]Fe_2O_3 y_1B_2O_3 y_2MoO_3 aq$ $x_1$: 0.125 $(x=x_1+x_2+x_3+x_4)$
$x_2$: 0.125
$x_3$: 0.25
$x_4$: 0.375 p1 $y_1$: 0.125
$y_2$: 0.125
aq: 1.0

| Analysis | % by weight |
|---|---|
| Zn | 6.6 (0.122) |
| Cu | 6.5 (0.124) |
| Fe | 17.9 (0.39) ($Fe^{2+}/Fe^{3+}$: 2.2) |
| Mn | 17.1 (0.38) |
| B | 2.0 (0.22) |
| Mo | 9.4 (0.12) |
| $H_2O$ | 17.3 (1.16) |

EXAMPLE 8b

The filter cake obtained in Example 8a is suspended in water in an inert gas atmosphere (nitric acid), followed by the addition of 5% by weight of humic acid, based on the micronutrient fertilizer. After stirring for 2 hours, the suspension is filtered, briefly washed, reliquefied, spray-dried and ground. C-analysis shows that approximately 96% of the complexing agent has been absorbed by the preparation.

EXAMPLE 9

The following solutions:

| a. | 0.434 g of $ZnCl_2$ |
| | + 12.588 g of $MnCl_2.4H_2O$ |
| | + 503.5 ml of $FeCl_2$-solution (360.0 g/l) diluted with water to 800 ml |
| | and |
| b. | 0.542 g of $CuCl_2.2H_2O$ dissolved in 100 ml of water | is added over a period of 60 minutes with stirring at room temperature in a nitrogen atmosphere to a solution of 4 g of Na-lignin sulfonate and 4 g of Na-humate in 800 ml of water. At the same time, a solution

| c. | 7.20 g of $MoO_3$ |
| | + 76.37 g of $Na_2B_4O_7.10H_2O$ |
| | + 49.6 g of Na-aluminate (51.4% of $Al_2O_3$, 46.98 g of NaOH) |
| | + 460 ml of 4.75 M NaOH-solution diluted with water to 800 ml | is added such that the pH-value is maintained at 9.5±0.5.P The suspension is then stirred for 18 hours at room temperature in an inert gas atmosphere. The deposit is filtered, washed until free from chloride, dried and ground.

System: $xMeO.[(1-x)/2]l\ Al_2O_3.y_1B_2O_3L.y_2MoO_3.aq$ x: 0.75 p1 $y_1$: 0.2
$y_2$: 0.025
(Me=Fe:Mn:Zn:Cu=450:20:1:1)
aq: 1.0

| Analysis | % by weight |
|---|---|
| Fe | 36.6 (0.715) |
| Mn | 1.6 (0.032) |
| Zn | 0.096 (0.0016) |
| Cu | 0.095 (0.0016) |
| Al | 6.2 (0.25) |
| B | 1.9 (0.19) |
| Mo | 2.1 (0.024) |
| $H_2O$ | 20.3 (1.23) |
| $C_{org.}$ | 0.8 (0.073) |

EXAMPLE 10

3.3 g of Na-lignin sulfonate and 3.3 g of Na-humate are dissolved in 800 ml of water. The following solutions are simultaneously introduced under nitrogen into the resulting solution over a period of 60 minutes with stirring at room temperature:

| a. | 1.64 g of $ZnCl_2$ |
| | + 26.13 g of $MnCl_2.4H_2O$ |
| | + 511.3 ml of $FeCl_2$-solution dissolved in water and diluted to 800 ml, |
| b. | 0.45 g of $CuCl_2.2H_2O$ in 100 ml of water and |
| c. | 0.46 g of $Na_2B_4O_7.10H_2O$ |
| | + 0.058 g of $MoO_3$ |
| | + 20.4 g of Na-aluminate (51.4% of $Al_2O_3$, 46.98% of NaOH) |
| | + 575 ml of 4.75 M NaOH solution diluted with water to 800 ml. |

Solution c. is added such that the pH-value remains in the range from 8.5 to 9.5.

The suspension is then stirred for 18 hours at room temperature in an inert gas atmosphere.

The deposit is filtered off, washed until free from chloride, dried and ground.

System: $xMeO.[(1-x)/2]L\ Al_2O_3.y_1B_2O_3.y_2MoO_3L.aq$ p1 x: 0.8
$y_1$: 0.0012
$y_2$: 0.0002
(Me=Fe:Mn:Zn:Cu=550:50:5:1)
aq: 1.0

| Analysis | % by weight |
| --- | --- |
| Fe | 36.2 (0.726) |
| Mn | 3.25 (0.066) |
| Zn | 0.38 (0.0065) |
| Cu | 0.075 (0.0013) |
| Al | 4.8 (0.20) |
| B | 0.022 (0.0023) |
| Mo | 0.015 (0.00018) |
| $H_2O$ | 2.0 (1.3) |
| $C_{org.}$ | 0.8 (0.075) |

EXAMPLE 11

57.6 g of $FeSO_4.7H_2O$, 32.5 g of $Al(OH)_3$ and 1.3 g of Na-lignin sulfonate are thoroughly mixed and the resulting mixture is made into a paste with 100 ml of water. The reaction is then carried out in an autoclave (200° C., approx. 15.6 bars, 6 hours). The reaction product then only has to be dried (120° C.) and ground.

System: $xFeO.[(1-x)/2]Al_2O_3.ySO_3aq + 2\%$ by weight of Na-lignin sulfonate x: 0.333
y: 0.333
aq: 1.5

| Analysis | % by weight |
| --- | --- |
| Fe | 18.8 (0.333) |
| Al | 18.3 (0.67) |
| S | 10.5 (0.324) |
| $H_2O$ | 11.9 (0.654) |
| C | 1.4 (0.115) |

EXAMPLE 12

33.1 g of $Na_2(Fe(CN)_5NO).2H_2O$ and 33.07 g of Na-aluminate (51.4% of $Al_2O_3$, 16.98% of NaOH) are added to a suspension of 26.78 g of $Ca(OH)_2$ in 400 ml of $H_2O$, followed by stirring for 30 minutes. 66.89 g of $CaCl_2.6H_2O$ dissolved in 400 ml of water are then added over a period of 30 minutes. Thereafter the suspension is stirred for 18 hours at 50° C., filtered and washed, followed by drying at 120° C. and grinding.

System: $x_1CaO[(1-x)/2]Al_2O_3yCa(Fe(CN)_5NO)aq$ x: $=x_1+y$
$x_1$: 0.555: 0.111
aq: 1.5

| Analysis | % by weight |
| --- | --- |
| Ca | 25.3 (0.66) |
| Al | 8.5 (0.33) |
| Fe | 5.33 (0.10) |
| $H_2O$ | 29.5 (1.7) |

EXAMPLE 13

98.6 g of $MgSO_4.7H_2O$, 4.8 g of citric acid and 200 ml of water are added to 303.8 ml of $FeSO_4$-solution (200 g/l), followed by stirring in an inert gas atmosphere (nitrogen) until a solution has formed. Precipitation is carried out with a solution consisting of 245.8 ml of NaOH solution (190 g/l) and 19.84 g of Na aluminate (51.5% of $Al_2O_3$, 16.981% of NaOH), made up with water to 500 ml, in an inert gas atmosphere, followed by stirring for 2 hours at pH 8.5, filtration and washing. Drying is carried out under nitrogen at 105° C.

System: $x_1FeOx_2MgO[(1-x)/2]Al_2O_3L\ ySO_3l\ zC_6H_8O_7aq$ $x = x_1 + x_2$
$x_1$: 0.4
$x_2$: 0.4
y: 0.1: 0.025
aq: 2.5

| Analysis | % by weight |
| --- | --- |
| Fe | 19.5 (0.41) |
| Mg | 7.8 (0.38) |
| Al | 4.6 (0.2) |
| S | 3.2 (0.12) |
| C | 1.4 (0.14) |
| $H_2O$ | 40.9 (2.66) |

EXAMPLE 14

4.8 g of citric acid are dissolved in 400 ml of water and the resulting solution is stirred in an inert gas atmosphere (nitrogen). A solution A (569.6 ml of an $FeSO_4$ solution containing 200 g of $FeSO_4$ per liter and a solution B (201.8 ml of an NaOH solution (190 g/l) containing 24.8 g of sodium aluminate (P. d. Haen, 51.4% of $Al_2O_3$, 46.981% of NaOH) are then added over a period of 30 minutes at a rate such that a pH-value of approximately 8.5 is maintained. The suspension is stirred for 1 to 2 hours in an inert gas atmosphere, subsequently filtered off and briefly washed. Drying is carried out in vacuo at 60° C.

System: $xFeO[(1-x)/2]Al_2O_3ySO_3z\ C_6H_8O_7aq$ x: 0.75
y: 0.125
z: 0.025
aq: 2.5

| Analysis | % by weight |
| --- | --- |
| Fe | 34.2 |
| Al | 5.25 (0.24) |
| S | 3.3 (0.128) |
| C | 1.4 (0.145) |
| $H_2O$ | 34.0 (2.3) |

EXAMPLE 15

1000 ml of water, to which 333 g of $FeSO_4.7H_2O$ and 133 g of $Al_2(SO_4)_3.18H_2O$ have been added, are heated to 85° C. followed by the addition with stirring in an inert gas atmosphere (nitrogen) of 45% by weight sodium hydroxide until a pH-value of 8.5 is attained. The suspension is kept at 85° C. for 6 hours, after which it is filtered, washed until free from sulfate, dried (105° C.) and ground.

System: $xFeO[(1-x)/2]Al_2O_3ySO_3aq$ x: 0.75
y: 0.125
aq: 3.0

| Analysis | % by weight |
|---|---|
| Fe | 30.1 (0.76) |
| Al | 4.8 (0.25) |
| S | 2.75 (0.121) |
| H$_2$O | 45.1 (3.5) |

EXAMPLE 16

509.8 ml of an Na-aluminate solution (20.0 g of Al$_2$O$_3$ per liter 100 g of NaOH per liter are added under nitrogen over a period of 30 minutes to 506.3 ml of FeSO$_4$ solution (240 g of FeSO$_4$ per liter. After the addition of 1.4 g of citric acid (corresponding to approximately 2% by weight, based on the depot fertilizer), the suspension is, if necessary, adjusted with sodium hydroxide to a final pH of 8.5, stirred for 2 hours, filtered and washed until free from sulfate. The resulting moist filter cake is spray-dried and then ground.

System: xFeO[(1−x)/2]Al$_2$O$_3$ySO$_3$aq+2% by weight of citric acid
x: 0.8
y: 0.1
aq: 2.0

| Analysis | % by weight |
|---|---|
| Fe | 40.3 (0.81) |
| Al | 4.8 (0.2) |
| S | 3.15 (0.11) |
| C | 0.7 (0.065) |
| H$_2$O | 29.0 (1.8) |

EXAMPLE 17

An experiment was performed with nitrate-containing composition compounds as N-depot fertilizers in quartz sand Plant: tomato, variety: "Rheinlands Ruhm", 3 plants per pot transplanted repeated 5 times, Substrate: quartz sand, fertilizer mixed in, Basic fertilization Hoagland-Arnon N-deficiency nutrient solution.

| Preparation (Example No.) | Composition | mg of N/l of quartz sand | Harvested almost 11 weeks after transplant | | |
|---|---|---|---|---|---|
| | | | ∅ growth height in cm | ∅ fresh weight in g | ∅ dry weight in g |
| 1 | Mg/Al/RO$_3$ | 75 | 18 | 7.1 | 1.0 |
| | | 150 | 20 | 7.8 | 1.1 |
| 3 | Ca/Al/NO$_3$ | 75 | 17 | 7.9 | 1.2 |
| | | 150 | 19 | 10.2 | 1.4 |
| 2 | Mg/Al/NO$_3$ | 75 | 18 | 9.0 | 1.2 |
| | | 150 | 21 | 13.1 | 1.6 |
| 5 | Ca/Al/Fe/NO$_3$ | 75 | 18 | 6.8 | 1.0 |
| | | 150 | 16 | 8.7 | 1.2 |
| Isodur (comparison N-depot fertilizer) | C$_6$H$_{14}$O$_2$N$_4$ isobutylidene di-urea | 75 | 12 | 4.1 | 0.6 |
| | | 150 | 16 | 8.5 | 1.0 |

The test results show that the nitrate-containing compositions are superior in their effect to the N-depot fertilizer Isodur because, in the relatively sterile quartz sand, Isodur cannot be reacted microbially to any significant extent.

EXAMPLE 18

An experiment was performed with nitrate-containing composition compounds as N-depot fertilizers in peat culture substrate Plant: tomato, variety: "Rheinlands Ruhm", 3 plants per pot transplanted, repeated 5 times Substrate: peat culture substrate: horticultural peat (white peat)+3 g/l of lime marl Basic fertilization: Hoagland-Arnon N-deficiency nutrient solution.

| Preparation (Example No.) | Composition | mg of N/l of peat culture substrate | Harvested 55 days after transplant | | | | |
|---|---|---|---|---|---|---|---|
| | | | ∅ growth height in cm | ∅ evaluation: 1 = best 9 = worst leaf greenness | growth pattern | ∅ fresh weight in g | ∅ dry weight in g |
| 1 | Mg/Al/NO$_3$ | 200 | 21.0 | 4.0 | 5.0 | 13.2 | 1.2 |
| | | 400 | 22.4 | 2.5 | 3.0 | 19.6 | 1.5 |
| 3 | Ca/Al/NO$_3$ | 200 | 25.7 | 3.5 | 4.5 | 20.0 | 1.8 |
| | | 400 | 28.5 | 2.5 | 2.5 | 26.8 | 2.2 |
| 2 | Mg/Al/NO$_3$ | 200 | 30.3 | 3.0 | 4.0 | 26.4 | 2.2 |
| | | 400 | 33.1 | 2.0 | 2.0 | 22.0 | 2.2 |
| 5 | Ca/Al/Fe/NO$_3$ | 200 | 24.9 | 3.3 | 4.3 | 22.8 | 2.1 |
| | | 400 | 24.5 | 3.5 | 2.5 | 27.0 | 2.0 |
| 4 | Ca/Al/Fe/NO$_3$ | 200 | 27.1 | 3.8 | 4.5 | 22.5 | 2.0 |
| | | 400 | 30.3 | 2.3 | 2.5 | 27.7 | 2.2 |
| Isodur (comparison N-depot fertilizer) | C$_6$H$_{14}$O$_2$N$_{24}$ isobutylidene di-urea | 200 | 27.7 | 4.0 | 4.8 | 18.5 | 1.8 |
| | | 400 | 16.1 | 2.5 | 4.0 | 16.2 | 1.0 |
| without additional N-fertilization | — | — | 17.7 | 5.0 | 7.0 | 6.4 | 0.5 |

The test results show that nitrate-containing compositions exert nitrogeneous effects on the tomato plants which are equivalent and, in many cases, superior to those of the urea condensate Isodur.

EXAMPLE 19

An experiment was performed with nitrate-containing compositions as N-depot fertilizers in solution culture (hydroculture)
  Plant: cucumber, variety: "Die Beste", 3 plants per pot planted as seedlings, repeated 3 times
  Culture medium: Hoagland-Arnon N-deficiency nutrient solution and tap water in the case of the comparison
  Lewatit HD 5 ® (a product of Bayer AG).

|  |  |  | Evaluation | | | | | |
|---|---|---|---|---|---|---|---|---|
|  |  |  | 1 = best | | | | 9 = worst | |
|  |  |  | Inspections | | | | | |
|  |  |  | 27 days | | 39 days | | 46 days | |
| Preparation (Example No.) | Composition | mg of N/l of solution | growth pattern | greenness | growth pattern | greenness | growth pattern | greenness |
| 1 | Mg/Al/NO$_3$ | 100 | 2.5 | 3.0 | 4.0 | 4.0 | 3.0 | 4.0 |
|  |  | 200 | 2.8 | 2.0 | 2.0 | 2.0 | 2.0 | 2.5 |
| 2 | Mg/Al/NO$_3$ | 100 | 2.5 | 2.5 | 2.8 | 2.5 | 3.0 | 3.0 |
|  |  | 200 | 2.5 | 2.0 | 1.8 | 2.0 | 2.0 | 1.8 |
| Isodur (N-depot fertilizer) | $C_6H_{14}O_2N_4$ isobutylidene di-urea | 100 | 3.0 | 3.0 | 6.0 | 5.0 | 4.5 | 5.0 |
|  |  | 200 | 2.3 | 2.5 | 4.8 | 4.0 | 4.0 | 5.0 |
| Lewatit HD 5 (hydrofertilizer) | an ion exchanger of polystyrene resin charged with approximately 18 g/l of N, 3 g/l of P, 12 g/l of K and trace nutrients (2.5%) | 100 | 2.5 | 2.0 | 1.8 | 2.3 | 2.0 | 3.5 |
|  |  | 200 | 2.0 | 2.0 | 1.8 | 2.3 | 1.5 | 2.8 |

In comparison with the long-term hydroculture fertilizer Lewatit HD 5 ®, it was found that the test plant, cucumber, can also be supplied extremely with nitrogen in hydroculture by nitrate-containing compositions, whereas the urea condensate fertilizer, Isodur, did not release sufficient nitrogen for absorption by the plant.

EXAMPLE 20

An experiment was performed with trace-nutrient-containing compositions as slow-flowing micronutrient fertilizers in peat culture substrate
  Plant: tomato, variety: "Rheinlands Ruhm", 2 plants per pot, repeated 5 times
  Culture medium: peat culture substrate prepared from horticultural peat (white peat)+3 g/l of lime marl Basic fertilization Hoagland-Arnon nutrient solution without trace nutrients, continuously applied.

|  |  |  | Evaluation and harvest weights | | | | | | | |
|---|---|---|---|---|---|---|---|---|---|---|
|  |  |  | 1 = best | | | | 9 = worst | | | |
|  |  |  | First growth | | | | First crop after cutting back | | | |
| Preparation Example No.) | Composition | mg of preparation/l of substrate | Ø evaluation 39 days | | first out 42 days | | evaluation 69 days | | second out 10 days | |
|  |  |  | growth pattern | greenness | fresh weight in g | dry weight in g | growth pattern | greenness | fresh weight in g | dry weight in g |
| 6a | Zn/Cu/Fe/Mn/ B/Mo | 5 | 1.8 | 3 | 48.3 | 3.4 | 2.5 | 3 | 40.7 | 2.8 |
|  |  | 10 | 1.8 | 3 | 49.0 | 3.8 | 2 | 3 | 36.3 | 2.4 |
|  |  | 25 | 1.8 | 3 | 51.7 | 3.9 | 2.3 | 3 | 38.1 | 2.5 |
|  |  | 50 | 1.8 | 3 | 53.1 | 4.1 | 2 | 3 | 43.2 | 3.0 |
| 6b | Zn/Cu/Fe/Mn/ B/Mo/EDTA | 5 | 1.8 | 3 | 52.2 | 4.2 | 2.3 | 3 | 35.2 | 2.5 |
|  |  | 10 | 1.8 | 3 | 51.9 | 4.1 | 1.8 | 3 | 37.6 | 3.0 |
|  |  | 25 | 1.5 | 3 | 52.8 | 4.2 | 1.8 | 3 | 43.4 | 3.1 |
|  |  | 50 | 1.5 | 3 | 60.2 | 4.6 | 1.8 | 3 | 51.3 | 3.5 |
| 7a | Zn/Cu/Fe/Mn/ B/Mo | 5 | 1.5 | 3 | 57.1 | 4.4 | 2 | 3 | 41.6 | 3.0 |
|  |  | 10 | 1.5 | 3 | 52.3 | 3.5 | 2.3 | 3 | 35.9 | 2.5 |
|  |  | 25 | 1.5 | 3 | 56.3 | 3.8 | 2 | 3 | 39.5 | 2.7 |
|  |  | 50 | 1.3 | 3 | 66.4 | 4.5 | 1.8 | 3 | 49.6 | 3.5 |
| 7b | Zn/Cu/Fe/Mn/ B/Mo/lign.-sul. | 5 | 1.3 | 3 | 59.9 | 4.2 | 2.3 | 3 | 38.3 | 2.5 |
|  |  | 10 | 1.5 | 3 | 55.8 | 4.4 | 2 | 3 | 40.5 | 2.8 |
|  |  | 25 | 1.5 | 3 | 57.0 | 4.3 | 1.8 | 3 | 47.5 | 3.4 |
|  |  | 50 | 1.5 | 3 | 61.4 | 4.6 | 1.5 | 3 | 52.1 | 4.0 |
| 8a | Zn/Cu/Fe/Mn/ B/Mo | 5 | 1.8 | 3 | 51.9 | 4.1 | 1.8 | 3 | 42.9 | 3.1 |
|  |  | 10 | 1.5 | 2.5 | 61.6 | 5.0 | 2.3 | 3 | 36.0 | 2.5 |
|  |  | 25 | 1.3 | 3 | 62.4 | 5.0 | 1.8 | 3 | 48.6 | 3.7 |
|  |  | 50 | 1.3 | 3 | 65.0 | 4.7 | 1.8 | 3 | 48.0 | 3.5 |
| 8b | Zn/Cu/Fe/Mn/ B/Mo/humic acid | 5 | 1 | 3 | 55.4 | 4.0 | 1.8 | 3 | 39.8 | 2.8 |
|  |  | 10 | 1.3 | 3 | 54.2 | 3.9 | 1.8 | 3 | 44.8 | 3.2 |
|  |  | 25 | 1.3 | 3 | 63.6 | 4.6 | 1.8 | 3 | 42.2 | 3.2 |
|  |  | 50 | 1 | 3 | 75.9 | 5.7 | 1.8 | 3 | 42.1 | 2.9 |
|  | nutrient solution without trace | — | 3.5 | 5 | 42.4 | 2.9 | 4 | 5 | 18.1 | 1.3 |

| | | | | | | | | | |
|---|---|---|---|---|---|---|---|---|---|
| | Evaluation and harvest weights | | | | | | | | |
| | 1 = best | | | 9 = worst | | | | | |
| nutrients complete nutrient solution | — | 2 | 3 | 53.0 | 4.0 | 2 | 3 | 43.6 | 4.0 |

| | | | Second crop after re-cutting | | | | | |
|---|---|---|---|---|---|---|---|---|
| | | mg of prepar- | evaluation 91 days | | third out 91 days | | Total | |
| Prepar- ation (Example No.) | Composition | ation/l of sub- strate | growth pattern | green- ness | fresh weight in g | dry weight in g | fresh weight in g | dry weight in g |
| 6a | Zn/Cu/Fe/Mn/ B/Mo | 5 | 1.3 | 2.3 | 59.8 | 4.7 | 148.8 | 10.9 |
| | | 10 | 2.3 | 3.3 | 51.5 | 3.8 | 136.8 | 10.0 |
| | | 25 | 2 | 3.3 | 49.8 | 3.6 | 139.6 | 10.0 |
| | | 50 | 1.5 | 2.8 | 61.3 | 4.8 | 157.6 | 11.9 |
| 6b | Zn/Cu/Fe/Mn/ B/Mo/EDTA | 5 | 2.5 | 3.5 | 49.0 | 3.6 | 136.4 | 10.3 |
| | | 10 | 2 | 2.5 | 58.2 | 4.7 | 147.7 | 11.8 |
| | | 25 | 2 | 3.3 | 54.1 | 4.1 | 150.3 | 11.4 |
| | | 50 | 2 | 3.3 | 56.0 | 4.1 | 167.5 | 12.2 |
| 7a | Zn/Cu/Fe/Mn/ B/Mo | 5 | 2 | 3 | 54.1 | 4.1 | 152.8 | 11.5 |
| | | 10 | 2 | 3.3 | 51.5 | 3.8 | 139.7 | 9.8 |
| | | 25 | 2 | 3.3 | 55.1 | 4.1 | 150.9 | 10.6 |
| | | 50 | 2 | 3.5 | 61.8 | 4.6 | 177.8 | 12.6 |
| 7b | Zn/Cu/Fe/Mn/ B/Mo/lign.- sul. | 5 | 2 | 3.3 | 52.9 | 3.9 | 151.1 | 10.6 |
| | | 10 | 2.3 | 3.5 | 48.7 | 3.5 | 145.0 | 10.7 |
| | | 25 | 1.8 | 2.3 | 61.1 | 4.7 | 165.6 | 12.4 |
| | | 50 | 1.5 | 2.5 | 57.6 | 4.8 | 171.1 | 13.4 |
| 8a | Zn/Cu/Fe/Mn/ B/Mo | 5 | 1.5 | 2.3 | 57.1 | 4.5 | 151.9 | 11.7 |
| | | 10 | 2.5 | 3.5 | 45.7 | 3.4 | 143.3 | 10.9 |
| | | 25 | 1.3 | 2 | 67.2 | 5.4 | 178.2 | 14.1 |
| | | 50 | 1.5 | 3.5 | 58.0 | 4.2 | 171.0 | 12.4 |
| 8b | Zn/Cu/Fe/Mn/ B/Mo/humic acid | 5 | 1.8 | 3.3 | 47.2 | 3.4 | 142.4 | 10.2 |
| | | 10 | 1.3 | 2.5 | 58.3 | 4.3 | 157.3 | 11.4 |
| | | 25 | 1.3 | 2.8 | 58.0 | 4.5 | 163.8 | 12.3 |
| | | 50 | 1.8 | 3.8 | 47.8 | 3.4 | 165.8 | 12.0 |
| | nutrient solution with- out trace nutrients | — | 4.5 | 5 | 25.6 | 1.9 | 86.1 | 6.1 |
| | complete nutrient solution | — | 1.8 | 3 | 70.2 | 5.7 | 166.8 | 13.7 |

Comparison with staggered addition of the micronutrients in the "complete nutrient solution" treatment shows that the trace-nutrient-containing compositions are effective, slow-flowing micronutrient fertilizers in peat-culture substrates. The inclusion of complexing substances generally increased the effectiveness of the composition fertilizers.

EXAMPLE 21

An experiment was performed with trace-nutrient-containing compositions as slow-flowing micronutrient fertilizers in peat culture substrate.

Plant: tomato, variety: "Rheinlands Ruhm", 1 plant per pot repeated 5 times,

Culture medium: peat culture substrate prepared from horticultural Peat (white peat)+3 g/l of lime marl Basic fertilization Hoagland-Arnon nutrient solution without trace nutrients, continuously applied.

| | | | | | ∅ evaluation greenness | | |
|---|---|---|---|---|---|---|---|
| | | mg of prepar- ation/l | ∅ height in cm | | 1 = best val. 9 = completely | ∅ weight in g 42 days | |
| Preparation (Example No.) | Composition | of sub- strate | 32 days | 45 days | chlorotic 33 days | fresh weight | dry weight |
| 9 | micronutrients/ ligninsulf./ humic acid | 5 | 11.2 | 15.2 | 2.1 | 17.3 | 1.5 |
| | | 10 | 11.8 | 16.4 | 2 | 16.1 | 2.2 |
| | | 25 | 12.4 | 16.8 | 2.1 | 16.8 | 1.5 |
| | | 50 | 15.0 | 22.6 | 2.2 | 23.3 | 2.0 |
| 10 | micronutrients/ ligninsulf./ humic acid | 5 | 9.6 | 11.6 | 2.1 | 12.5 | 1.1 |
| | | 10 | 10.8 | 14.6 | 2.2 | 15.3 | 1.5 |
| | | 25 | 12.4 | 17.4 | 2.2 | 18.1 | 1.6 |
| | | 50 | 17.6 | 23.0 | 2.2 | 26.1 | 2.3 |
| Fetrilon Combi | 2.4% Mg, 1.5% Fe, 1.5% Mn, 0.5% Cu, 0.3% B and traces | 20 | 9.6 | 11.2 | 2.1 | 10.8 | 1.1 |

| Preparation (Example No.) | Composition | mg of preparation/l of substrate | ⌀ height in cm 32 days | ⌀ height in cm 45 days | ⌀ evaluation greenness 1 = best val. 9 = completely chlorotic 33 days | ⌀ weight in g 42 days fresh weight | ⌀ weight in g 42 days dry weight |
|---|---|---|---|---|---|---|---|
| — | of Mo and Co Hoagland nutrient solution without any trace nutrients, applied by pouring | — | 11.2 | 14.2 | 2.2 | 13.7 | 1.3 |

The test results show that the two trace-nutrient-containing composition compounds are quite capable of contributing to the supply of micronutrients to plants.

EXAMPLE 22

An experiment was performed with trace-nutrient-containing composition compounds as slow-flowing micronutrient fertilizers in solution culture (hydroculture)

Plant: cucumber, variety: "Die Beste", 3 plants per pot, repeated 3 times

Culture medium: Hoagland-Arnon trace-element deficiency nutrient solution

Example 7b which contains 4% sodium lignin sulfonate so that the heavy metal trace nutrients are complexed. In contrast, the addition of humic acid did not have any such positive effect possibly because the availability of the copper to the plant may be restricted in this case on account of the formation of sparingly soluble Cu-humates.

EXAMPLE 23

An experiment was performed with trace-nutrient-containing compositions as slow-flowing micronutrient fertilizers in solution culture (hydroculture)

Plant: cucumber, variety: "Die Beste", 3 plants per

| Preparation (Example No.) | Composition | mg/l | Evaluation 1 = best 9 = worst evaluation 4 days ⌀ growth pattern | evaluation 4 days ⌀ greenness | evaluation 40 days ⌀ growth pattern | evaluation 40 days ⌀ greenness | evaluation 54 days ⌀ growth pattern | evaluation 54 days ⌀ greenness | ⌀ growth height in cm |
|---|---|---|---|---|---|---|---|---|---|
| 7a | micronutrients | 5 | 4 | | 2.5 | 2.5 | 2.5 | 2.3 | 27.3 |
| | | 10 | 3 | | 2.5 | 2 | 2.3 | 2.3 | 32.1 |
| | | 25 | 3 | 2.5 | 2 | 2 | 2.5 | 3 | 41.7 |
| | | 50 | 2 | | 2.5 | 2.5 | 2.5 | 4.5 | 43.8 |
| 7b | micronutrients/ lignin sulfonate | 5 | 2.5 | | 2 | 2 | 2 | 2 | 41.0 |
| | | 10 | 2.5 | | 2 | 2.5 | 2.3 | 2 | 41.7 |
| | | 25 | 2.5 | 2.5 | 2.5 | 2.5 | 2.5 | 2.3 | 37.6 |
| | | 50 | 2.5 | | 2.5 | 2.8 | 3 | 4 | 31.2 |
| 8a | micronutrients | 5 | 3.5 | | 3 | 2.5 | 2.5 | 2.3 | 31.2 |
| | | 10 | 3.5 | | 2.5 | 2.8 | 2.3 | 2.3 | 39.4 |
| | | 25 | 4 | 2.5 | 3 | 2.8 | 2.8 | 3.5 | 33.9 |
| | | 50 | 3.5 | | 3 | 2.5 | 2.8 | 4.5 | 34.4 |
| 8b | micronutrients/ humic acid | 5 | 4 | | 2.5 | 2.5 | 2.5 | 2.3 | 34.6 |
| | | 10 | 4 | | 2.5 | 2.5 | 2.5 | 2.3 | 34.6 |
| | | 25 | 4.5 | 3 | 3.5 | 2.5 | 4 | 2.3 | 20.6 |
| | | 50 | 5 | | 4 | 3.0 | 4.5 | 3 | 16.7 |
| | nutrient solution without trace nutrients | — | 5 | 2.5 | 3.5 | 3 | 3.8 | 2.8 | 22.7 |
| | complete nutrient solution | — | 3.5 | 2 | 3.5 | 2 | 3 | 1.5 | 23.2 |

In solution culture (hydroculture), also, trace-nutrient-containing composition compounds are effective micronutrient fertilizers which slowly release the nutrients. The best effect is developed by the preparation of pot, planted as seedlings, repeated 3 times Culture medium: Hoagland nutrient solution without any trace nutrients.

| Preparation (Example No.) | Composition | mg of preparation/l of nutrient solution substrate | ∅ height in cm 32 days | ∅ height in cm 45 days | ∅ Evaluation of greenness 1 = best value 9 = completely chlorotic 33 days | ∅ weight in g 45 days fresh weight | ∅ weight in g 45 days dry weight |
|---|---|---|---|---|---|---|---|
| 9 | micronutrients/ lignin sulf./ humic acid | 5 | 14.5 | 18.4 | 2.7 | 17.1 | 1.6 |
|  |  | 10 | 19.4 | 25.7 | 2.8 | 23.8 | 2.4 |
|  |  | 25 | 20.0 | 30.8 | 2.6 | 29.1 | 2.6 |
|  |  | 50 | 17.1 | 34.2 | 2.7 | 27.9 | 2.3 |
| 10 | micronutrients/ lignin sulf./ humic acid | 5 | 26.9 | 31.0 | 2.6 | 23.1 | 2.2 |
|  |  | 10 | 30.5 | 46.4 | 3.2 | 34.8 | 2.9 |
|  |  | 25 | 29.1 | 40.0 | 2.8 | 27.7 | 2.3 |
|  |  | 50 | 23.2 | 35.7 | 3.2 | 24.6 | 2.3 |
| Hydro-fertilizer lewatit HD-5 | ion exchanger fertilizer of polystyrene resin charged with approx. 18 g/l of N, 3 g/l of P, 12 g/l of K and trace nutrients | 12 ml | 20.7 | 22.5 | 2.1 | 15.3 | 1.4 |
| — | Hoagland nutrient solution without any trace nutrients | — | 13.3 | 15.0 | 2.8 | 16.6 | 1.8 |

These test results show that the two trace-nutrient-containing compositions are suitable for supplying trace nutrients to plants in solution culture (hydroculture).

EXAMPLE 24

An experiment was performed with iron-containing composition compounds as iron depot fertilizers mixed into an inert substrate consisting of a mixture of polystyrene foam flakes (Styromull) and potassium alginate in a ratio by volume of 10:1

Test Plants: chlorotic iron-deficient chrysanthemums,
variety: Yellow Delaware, 3 plants per pot, Substrate solution: Hoagland-Arnon iron deficiency solution.

| Preparation (Example No.) | Composition | mg of preparation/l of substrate | ∅ Evaluation of the greenness of young leaves 1 = deep dark green (best value) 9 = completely chlorotic (yellow-white) | | | |
|---|---|---|---|---|---|---|
|  |  |  | 11 days | 22 days | 29 days | 45 days |
| 11 | Fe/Al/lignin sulf. | 316 | 3.8 | 2.8 | 2 | 2 |
| 12 | Ca/Al/Fe(CN)$_5$—NO | 250 | 2.1 | 1.8 | 2.1 | 2.1 |
|  |  | 500 | 2.3 | 1.8 | 2 | 1.5 |
| Fetrilon (for comparison) | Na$_2$—Fe—Ethylene diamine tetra-acetate containing 5% of Fe | 200 | 3.8 | 5 | 5.8 | 6.7 |
|  | untreated (control) | — | 9 | 9 | 9 | 9 |

When taken up through the roots of chlorotic iron-deficient chrysanthemum plants, the iron-containing composition compounds show an outstanding and particularly long-lasting antichlorotic effect.

EXAMPLE 25

An experiment was performed with trace-nutrient-containing compositions as microelement leaf fertilizers
Test Plants: cucumber, variety: "Die Beste" 1 plant per pot, repeated 4 times.
Basic root fertilization through Hoagland-Arnon nutrient solution, but without any trace nutrient
Spraying twice 5 days apart.

| Preparation (Example No.) | Compostion | g of preparation/ 1 of spray liquid | g of citric acid/l of spray liquid | ∅ Evaluation 1 = best value 9 = worst value | | | Growth in height in cm 15 days |
|---|---|---|---|---|---|---|---|
| | | | | 14 days general growth pattern | leaf greenness | damage | |
| 8a | micronutrients | 2.5 | — | 4 | 4.5 | 4 | 24 |
| 6b | micronutrients/ EDTA | 5 5 | — 10 | 4 4 | 5 3 | 2.5 4.5 | 20.9 25.9 |
| 7b | micronutrients/ lignin sulfonate | 5 | — | 4.5 | 5 | 3 | 19 |
| Fetrilon Combi (for comparison) | 2.4% mg, 1.5% Fe, 1.5% Mn, 0.5% Zn, 0.5% Cu, 0.3% B and traces of Mo and Co | 5 | — | 5 | 2.8 | 7 | 14.3 |
| — | untreated (control) | — | — | 6 | 5 | 4 | 12.7 |

By comparison with the standard product, the trace-nutrient-containing compositions are highly effective as trace element leaf fertilizers. Leaf greenness is intensified by additional incorporation of the complexing agent citric acid. The compatibility of the compositions was more favorable than that of the fertilizer used for comparision.

EXAMPLE 26

An experiment was performed with trace-nutrient-containing composition compounds as microelement leaf fertilizers
Test Plant: cucumber, variety: "Die Beste", 1 plant per pot, repeated 5 times
Basic root fertilization through Hoagland-Arnon nutrient solution without any microelements
Spraying twice, 4 days apart.

The effect of trace-nutrient-containing composition compounds as microelement leaf fertilizers was extremely favorable by comparison with a commercial preparation. When the composition compound is combined with citric acid, the leaves become brighter green in color. The high plant compatibility of the composition compared with the standard product is particularly noticeable.

EXAMPLE 27

An experiment was performed with iron-containing compositions as iron leaf fertilizers (chlorosis inhibitors)
Test Plants: chlorotic iron-deficient chrysanthemum plants,
variety: "Yellow Delaware", 2 plants per pot, repeated 4 times
Substrate: Hoagland-Arnon iron deficiency nutrient solution. Care was taken to ensure that none of the Fe-containing spray liquid entered the iron deficiency nutrient solution in the vicinity of the roots.
Spraying twice, 5 days apart.

| Preparation (Example No.) | Composition | g of preparation/ 1 of spray liquid | ∅ Evaluation 1 = best value 9 = worst value 11 days greenness of young leaves | Leaf damage | ∅ Number of grown leaves 11 days |
|---|---|---|---|---|---|
| 9 | micronutrients/ ligninsulf./ humic acid | 2.5 | 3.1 | 1.5 | 3.5 |
| 10 | micronutrients/ ligninsulf./ humic acid | 5 | 3.7 | 1.5 | 2 |
| 10 | micronutrients/ ligninsulf./ humic acid + 5 g/l of citric acid | 2.5 | 2.1 | 2 | 1 |
| Fetrilon Combi (for comparison) | 2.4% mg, 1.5% Fe, 1.5% Mn, 0.5% Zn, 0.5% Cu, 0.3% B and traces of Mo and Co | 1 | 3.8 | 8 | 0.5 |
| — | untreated (control) | — | 5.2 | 4.5 | 0.5 |

| Preparation (Example No.) | Composition | Fe-preparation | Additions in g per liter of spray liquid | | | ⌀ Evaluation of the greenness of young leaves 1 = deep dark green (best value) 9 = completely chlorotic | | ⌀ Number of newly grown young leaves |
|---|---|---|---|---|---|---|---|---|
| | | | citric acid | methyl cellulose | glycerol in ml | 13 days | 16 days | 16 days |
| 13 | Fe/Mg/S/ | 5.25 | — | — | — | 8.9 | 9 | 0.5 |
| | citric acid | 5.25 | 10 | — | — | 2.9 | 3.6 | 2.5 |
| | | 5.25 | 10 | 5 | — | 2.1 | 2.4 | 3.5 |
| | | 5.25 | 10 | — | 1 | 2.3 | 2.4 | 3.5 |
| 14 | Fe/Al/S/ | 3 | — | — | — | 8 | 9 | 1.5 |
| | citric acid | 3 | 10 | — | — | 3 | 3.5 | 2.5 |
| | | 3 | 10 | 5 | — | 2.1 | 2.2 | 3.3 |
| | | 3 | 10 | — | 10 | 2.2 | 2.7 | 3 |
| Comparison preparation | FeSO$_4$.7H$_2$O | 10 | — | — | — | 1.8 | 2 | 3 but with leaf damage |
| — | untreated (control) | — | — | — | — | 9 | 9 | 0.5 |

In order fully to develop a chlorosis-inhibiting effect as leaf fertilizers, the Fe-compositions require a correspondingly large addition of Fe-complexing agents, for example citric acid. The quantity of complexing agent required may exceed the uptake capacity of the inorganic matrix. As this example shows, the extra demand may be met by a supplement, i.e. it is sufficient for relatively large quantities of complexing agents to be added only during the actual formulation of the preparations.

In addition to complexing agents, the simultaneous addition of agglutinants, such as glycerol, further intensifies the chlorosis-inhibiting effect.

EXAMPLE 28

An experiment was performed with compositions having various Fe-contents as iron leaf fertilizers (chlorosis-inhibiting agents)

Test Plant: chlorotic iron-deficient chrysanthemum plants,
variety: "Yellow Delaware", 2 plants per pot
Substrate: Hoagland-Arnon iron deficiency nutrient solution. Care was taken to ensure that none of the Fe-containing spray liquid passed into the iron-deficiency nutrient solution in the vicinity of the roots. Spraying twice, 5 days apart.

As leaf fertilizers, the iron-containing compositions in conjunction with citric acid in a ratio by weight of 1:2 have an extremely good chlorosis-inhibiting effect on chrysanthemums. Their chlorosis-inhibiting effect is superior to that of the comparison fertilizer Na$_2$-Fe-EDTA which easily produces leaf damage in relatively high doses. The dependence of the chlorosis-inhibiting effect upon the amount of Fe incorporated is only of minor importance when correlated with equal doses of Fe.

EXAMPLE 29

An experiment was performed with iron-containing compositions in combination with increasing quantities of citric acid as leaf fertilizers Test Plant: chlorotic iron-deficient chrysanthemum plants,
variety: "Yellow Delaware", 2 plants per pot, repeated 4 times
Substrate: Hoagland-Argon iron deficiency nutrient solution.
Care was taken to ensure that none of the iron-containing spray liquid passed into the iron deficiency nutrient solution in the region of the roots.
Spraying twice, three days apart.

| Preparation (Example No.) | Composition | Fe-content (% by weight) | Additions in g/l of spray liquid | | ⌀ Evaluation of the greenness of young leaves 1 = deep dark green (best value) 9 = completely chlorotic | | | ⌀ Number of newly grown young leaves |
|---|---|---|---|---|---|---|---|---|
| | | | Fe-preparation | citric acid | 15 days | 20 days | 27 days | 20 days |
| 15 | Fe/Al/S | 30.1 | 7 | 14 | 2.2 | 2.2 | 2.7 | 4.5 |
| 11 | Fe/Al/S/ lignin s. | 18.8 | 11 | 22 | 2.1 | 2.1 | 2.5 | 5 |
| 16 | Fe/Al/S | 40.4 | 5.25 | 10.5 | 2.9 | 2.3 | 3.4 | 4.5 |
| 14 | Fe/Al/S/ citric acid | 34.2 | 7.5 | 15 | 2.2 | 2.9 | 3.5 | 5 |
| Fetrilon (comparison preparation) | Na$_2$—Fe—EDTA | 5 | 2 | — | 4.5 | 5 | 5.5 | 3 |
| — | untreated (control) | — | — | — | 7.9 | 8.1 | 8.4 | 1.5 |

| Preparation (Example No.) | Composition | Quantities applied in g/l of spray liquid | | Ratio by weight of Fe composition compound to citric acid | ∅ Evaluation of the greenness of young leaves 1 = deep dark green (best value) 9 = completely chlorotic | | | ∅ Number of newly grown young leaves |
|---|---|---|---|---|---|---|---|---|
| | | Fe-preparation | citric acid | | 14 days | 18 days | 27 days | 27 days |
| 14 | Fe/Al/S/ citric acid | 5.9 | 2.5 | 1:0.4 | 3.4 | 4.3 | 4.9 | 3.8 |
| | | 5.9 | 5 | 1:0.8 | 2.2 | 3.8 | 4.6 | 4.5 |
| | | 5.9 | 7.5 | 1:1.3 | 2 | 2.3 | 4.2 | 4 |
| | | 5.9 | 10 | 1:1.7 | 2 | 2.3 | 3.7 | 3.8 |
| | | 5.9 | 12.5 | 1:2.1 | 2 | 2.3 | 3.4 | 3.5 |
| | | 5.9 | 15 | 1:2.5 | 2 | 2.4 | 3.4 | 4 |
| | | 7.4 | 2.5 | 1:0.3 | 2.9 | 3.3 | 4.7 | 4.3 |
| | | 7.4 | 5 | 1:0.7 | 2.4 | 3 | 4.5 | 4.5 |
| | | 7.4 | 7.5 | 1:1 | 2 | 2.4 | 3.8 | 4.3 |
| | | 7.4 | 10 | 1:1.3 | 2 | 2.3 | 4 | 3.5 |
| | | 7.4 | 12.5 | 1:1.7 | 1.9 | 2 | 3.6 | 3.5 |
| | | 7.4 | 15 | 1:2 | 2 | 2 | 3.4 | 3 |
| | untreated (control) | — | — | — | 7 | 8 | 9 | 1.5 |

In combination with citric acid in a ratio by weight of from 1:1 to 1:2, the iron-containing compositions used as a leaf fertilizer in this experiment produces the best antichlorotic effects.

EXAMPLE 30

An experiment was performed with iron-containing compositions as iron leaf fertilizers (chlorosis-inhibitors)

Test Plant: chlorotic iron-deficient chrysanthemum plants,
variety: "Yellow Delaware" 2 plants per pot, repeated 4 times
Substrate: Hoagland-Arnon iron deficiency nutrient solution.
Care was taken to ensure that none of the Fe-containing spray liquid entered the iron deficiency nutrient solution in the vicinity of the roots.
Spraying twice, two days apart.

The addition of complexing agents to the iron-containing compound enhances its chlorosis-curing effect on application to the leaf. The Na-lignin sulfonates have to be used in higher dosages than the citric acid. Despite being used in smaller quantities, the comparison preparation $Na_2$-Fe-EDTA causes unacceptable leaf damage and has an unsatisfactory antichlorotic after-effect.

EXAMPLE 31

An experiment was performed with iron-containing compositions as iron leaf fertilizers (chlorosis inhibitors) following the addition of various iron complexing agents.

Test plant: chlorotic iron-deficient chrysanthemum plants,
variety: "Yellow Delaware", 2 plants per pot, repeated 4 times.
Substrates: Hoagland-Arnon iron deficiency nutrient solution.
Care was taken to ensure that non of the Fe-containing spray liquid entered the iron deficiency nutrient solution in the region of the roots.
Spraying twice, 3 days apart.

| Preparation (Example No.) | Composition | Additions in g/l of spray liquid | | | | ∅ Evaluation of the greenness of young leaves 1 = deep dark green (best value) 9 = completely chlorotic | | ∅ Number of newly grown young leaves |
|---|---|---|---|---|---|---|---|---|
| | | Fe-preparation | citric acid | Na-lignin sulfonates of the Lignin-Chemie Waldhof-Holmen | | | | |
| | | | | Zewa S | Zewa EF | 13 days | 26 days | 26 days |
| 14 | Fe/Al/S/ citric acid | 7.5 | — | — | — | 5.2 | 8 | 3.5 |
| | | 7.5 | 5 | — | — | 2 | 3.5 | 5 |
| | | 7.5 | 10 | — | — | 2 | 2.1 | 6 |
| | | 7.5 | — | 15 | — | 2 | 2.9 | 5 |
| | | 7.5 | — | — | 15 | 2 | 2.5 | 5 |
| Fetrilon (for comparison) | $Na_2$—Fe—Ethylene diamine tetraacetate containing 5% of Fe | 2 | — | — | — | 3 | 7.7 | 4 |
| — | untreated (control) | — | — | — | — | 8.5 | 9 | 2 |

| Preparation (Example No.) | Composition | Fe-complexing agent | Additions in g/l of spray liquid Fe-complexing agent | | | | | | | ∅ Evaluation of the greenness of young leaves 1 = deep dark green (best value) 9 = completely chlorotic | | ∅ Number of newly grown young leaves |
|---|---|---|---|---|---|---|---|---|---|---|---|---|
| | | | citric acid | quinaldic acid | chromotropic | cojic acid | cop-peron | thioglycolic acid | salicyclic acid | 13 days | 21 days | 21 days |
| 14 | Fe/Al/S/ citric acid | 7.5 | 5 | — | — | — | — | — | — | 2 | 3.4 | 4 |
| | | 7.5 | 5 | 0.01 | — | — | — | — | — | 1.5 | 2.9 | 4.5 |
| | | 7.5 | 5 | — | — | — | 0.01 | — | — | 2 | 2.7 | 4 |
| | | 7.5 | 5 | — | — | — | — | 0.01 | — | 2 | 2.8 | 4.5 |
| | | 7.5 | 5 | — | — | — | — | — | 0.01 | 1.5 | 2.7 | 4 |
| | | 7.5 | 5 | 0.1 | — | — | — | — | — | 1.5 | 2.6 | 4.5 |
| | | 7.5 | 5 | — | 0.1 | — | — | — | — | 1.5 | 2.9 | 4 |
| | | 7.5 | 5 | — | — | 0.1 | — | — | — | 1.5 | 2.5 | 4.5 |
| | | 7.5 | 5 | — | — | — | 0.1 | — | — | 1.5 | 2.7 | 4.5 |
| | | 7.5 | 10 | — | — | — | — | — | — | 2 | 2.1 | 4.5 |
| — | untreated | — | — | — | — | — | — | — | — | 9 | 8 | 1.5 |

Where non-optimal quantities of citric acid are used, comparitively small additions of highly active iron complexing agents are capable of improving the clorosis-inhibiting effect of the iron-containing compositions used as Fe-leaf fertilizers.

EXAMPLE 32

An experiment was performed with iron-containing compositions as iron leaf fertilizers in combination with citric acid and $Fe^{3+}$-reducing compounds Test Plant: chlorotic iron-deficient chrysanthemum plants.
Variety: "Yellow Delawre", 2 plants per pot, repeated 5 times
Substrate: Hoagland-Arnon iron deficiency nutrient solution.
Care was taken to ensure that none of the Fe-containing spray liquid entered the iron deficiency nutrient solution in the vicinity of the roots.
Spraying twice, 3 days apart.

The addition of $Fe^{3+}$-reducing compounds, such as ascorbic acid or thioglycolic acid, to the leaf fertilizer system consisting of an iron-containing composition and citric acid improves the chlorosis inhibiting effect.

EXAMPLE 33

An experiment was performed with iron-containing compositions as iron leaf fertilizers with partial replacement of the Fe-preparation by iron salts (total Fe-content corresponding to 10 g of $FeSO_4.7H_2O$/liter of spray broth).

Test plant: chlorotic iron-deficient chrysanthemum plants,
variety: "Yellow Delaware", 2 plants per pot, repeated 4 times
Substrate: Hoagland-Arnon iron-deficiency nutrient solution
Care was taken to ensure that none of the Fe-containing spray liquid entered the iron deficiency nutrient solution in the vicinity of the roots.

| Preparation (Example No.) | Composition | Additions in g/l of spray liquid | | | | ∅ Evaluation of the greenness of young leaves 1 = deep dark green (best value) 9 = completely chlorotic | | ∅ Number of newly grown young leaves | ∅ Evaluation of leaf damage 1 = best value (none) 9 = worst value |
|---|---|---|---|---|---|---|---|---|---|
| | | Fe-preparation | citric acid | ascorbic acid | thioglycolic acid | 11 days | 15 days | 15 days | 11 days |
| 14 | Fe/Al/S/ citric acid | 7.5 | — | — | — | 7.8 | 6.5 | 3.5 | 1 |
| | | 7.5 | 10 | — | — | 2.6 | 3.5 | 4.5 | 1 |
| | | 7.5 | 10 | 0.25 | — | 1.9 | 2.4 | 5.5 | 1 |
| | | 7.5 | 10 | — | 0.1 | 2 | 2.2 | 6 | 2 |
| | | 7.5 | 5 | — | — | 2.6 | 4.6 | 4 | 2.5 |
| | | 7.5 | 5 | — | 0.25 | 2.1 | 3.1 | 5 | 2.5 |
| — | untreated (control) | — | — | — | — | 8.8 | 9 | 3 | 1 |

Spraying twice, 3 days apart.

| Preparation (Example No.) | Composition | Fe-preparation | Additions in g/l of spray liquid | | | | | Wargotan (Ca-ligninsulfonate) | urea |
|---|---|---|---|---|---|---|---|---|---|
| | | | citric acid | $FeSO_4.7H_2O$ | $FeCl_2.4H_2O$ | $Fe(NO_3)_2.9H_2O$ | Fe(III) citrate | | |
| — | — | — | 10 | 10 | — | — | — | — | — |
| — | — | — | 10 | 10 | — | — | — | 5 | — |
| 14 | Fe/Al/S/ citric acid | 5.9 | 10 | — | — | — | — | — | — |
| | | 4.5 | 10 | 2.5 | — | — | — | — | — |
| | | 4.5 | 10 | — | — | 3.1 | — | — | — |
| | | 4.5 | 10 | — | — | 3.1 | — | — | — |
| | | 4.5 | 10 | — | — | — | 2.7 | 5 | — |
| | | 4.5 | 10 | 1.3 | — | 1.6 | — | — | — |
| | | 4.5 | 10 | 1.3 | 0.9 | — | — | 5 | — |

| | | 4.5 | 10 | 2.5 | — | — | — | 5 | 5 |
|---|---|---|---|---|---|---|---|---|---|
| — | untreated (control) | — | — | — | — | — | — | — | — |

| Preparation (Example No.) | Composition | ∅ Evaluation of the greenness of young leaves  1 = deep dark green (best value)  9 = completely chlorotic | | ∅ Number of newly grown young leaves | ∅ Evaluation of leaf damage  1 = best value (none)  9 = worst value |
|---|---|---|---|---|---|
| | | 25 days | 33 days | 33 days | 25 days |
| — | — | 2.4 | 2.9 | 6 | 5 |
| — | — | 2.3 | 2.9 | 6 | 5 |
| 14 | Fe/Al/S/ citric acid | 3.1 | 2.9 | 6 | 2 |
| | | 2.3 | 3 | 6 | 2 |
| | | 2.1 | 2.8 | 6 | 2 |
| | | 2.9 | 3.5 | 6 | 2 |
| | | 2.5 | 2.8 | 7 | 2 |
| | | 2.3 | 2.5 | 7 | 2 |
| | | 2.2 | 2.6 | 7 | 2 |
| | | 2 | 2 | 7 | 3 |
| — | untreated (control) | 7.4 | 8 | 2 | 1 |

Although the sole use of a leaf fertilizer system consisting of iron sulfate and citric acid produces favorable chlorosis-inhibiting effects, it also causes unacceptable leaf damage. No leaf damage occurs where the Fe leaf fertilizer system of an Fe composition and citric acid is applied. In order to accelerate the chlorosis-curing effect, it can be advantageous to replace some of the Fe-source: composition by generally more soluble iron salts. The addition of urea also has a favorable effect.

It will be appreciated that the instant specification and examples are set forth by way of illustration and not limitation, and that various modifications and changes may be made without departing from the spirit and scope of the present invention.

We claim:

1. A depot ferilizer composition comprising an inorganic matrix and another inorganic and optionally organic component of the formula

$$XMe(II)O \cdot [(1-X)/2]Me(III)_2O_3 \cdot YA \cdot zI \cdot aq$$

in which

Me (II) is at least one divalent metal,
Me (III) is at least one trivalent metal,
wherein iron is present as at least part of Me (II) and Me (III)
A is at least one inorganic acid or anhydride of an inorganic acid,
I is at least one organic compound,
aq is $0.5$–$9H_2O$,
X is from above 0 to 1,
Y is from 0.0014 to 0.7, and
Z is from 0 to 20,
at least one of the components containing a plant nutrient element.

2. A depot fertilizer according to claim 1, wherein the divalent metals are selected from the group consisting of calcium, magnesium, iron, copper, nickel, cobalt and zinc, and the trivalent metals are selected from the group consisting of aluminum, iron and manganese.

3. A depot fertilizer according to claim 1, wherein said inorganic acid and/or anhydride is an inorganic acid and/or anhydride of the elements nitrogen, phosphorus, sulfur, chlorine, boron, carbon, silicon, molybdenum, titanium and/or vanadium.

4. A depot fertilizer according to claim 1, wherein said organic component is a complexing agent and/or a plant-protection agent and/or a nutrient-containing organic compound.

5. A depot fertilizer according to claim 1, wherein aq is from about 0.5 to 6, and x is from about 0.2 to 0.9.

6. A process for fertilizing the leaves of a plant which comprises applying to such leaves a composition according to claim 1.

7. A process for fertilizing a plant growing in soil or other solid substrate which comprises applying to such soil or other solid substrate a composition according to claim 1.

8. A process for fertilizing a plant growing in water which comprises applying to the water a composition according to claim 1.

* * * * *